July 18, 1933.  C. M. HOUSE ET AL  1,918,544
COMBINED AUTOMATIC STOP AND CHECK VALVE
Filed Aug. 15, 1930
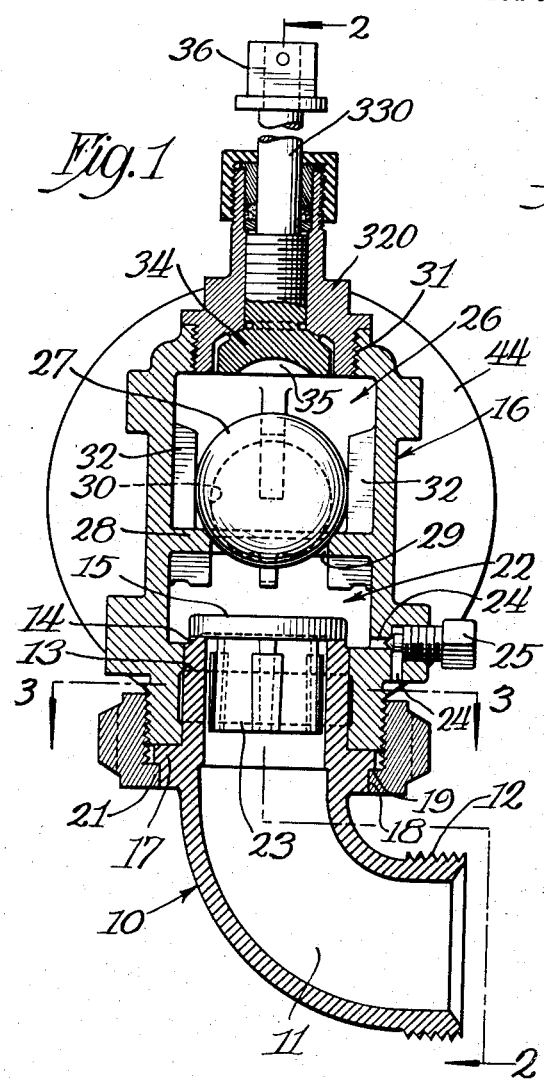
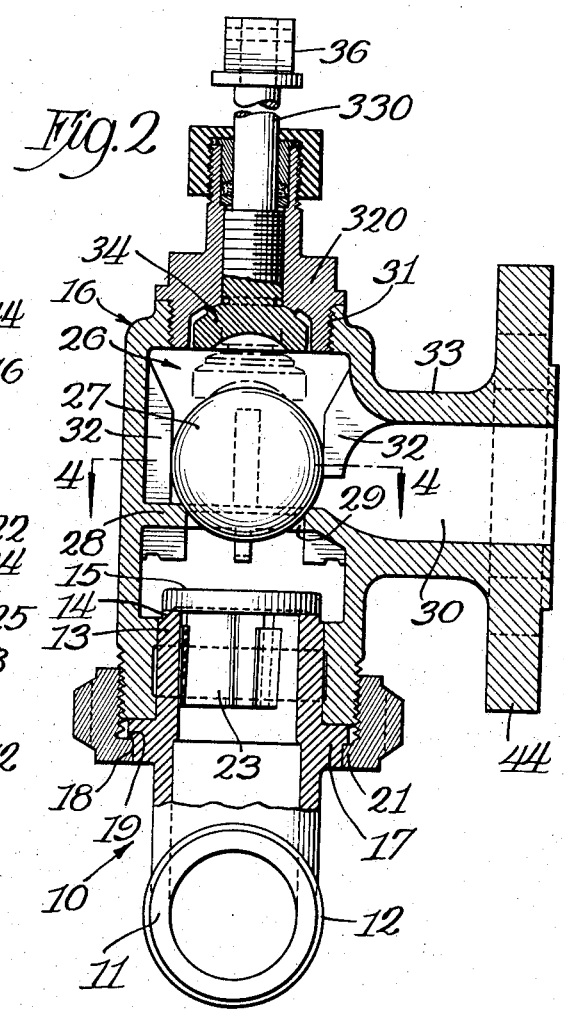
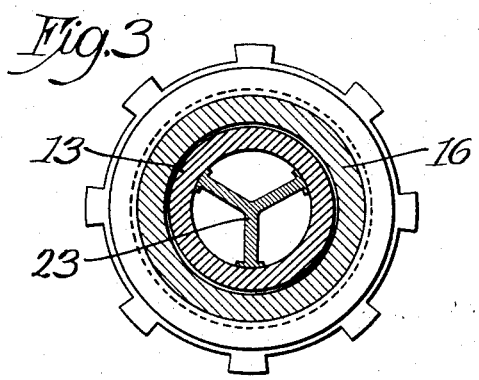
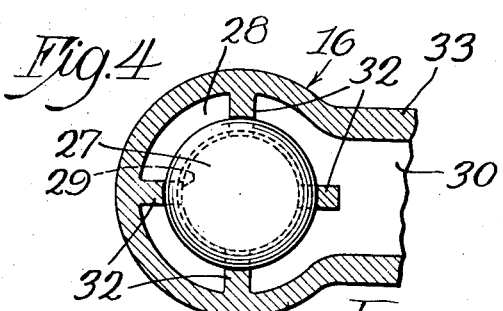
Inventors
Charles M. House
Carl J. Clutter
By Gillson, Mann Hoy Attys.

Patented July 18, 1933

1,918,544

UNITED STATES PATENT OFFICE

CHARLES M. HOUSE, OF BLOOMINGTON, AND CARL J. CLUTTER, OF NORMAL, ILLINOIS

COMBINED AUTOMATIC STOP AND CHECK VALVE

Application filed August 15, 1930. Serial No. 475,480.

This invention relates to stop and check valves, and more particularly to automatically operated stop and check valves for use with injectors in steam boilers and the like.

The principal object of the invention is the provision of a combined stop and check valve that is automatic in its operation during the normal operation of the injector in supplying water to the boiler, and that may be positively held on its seat when so desired.

Another object of the invention is the provision of combined stop and check valve that is simple in construction, self-cleaning, easily assembled, automatic in its normal operation, and that is not likely to become broken or to get out of order.

Other and further objects and advantages of the invention will appear from the following description, taken in connection with the accompanying drawing, in which Fig. 1 is a vertical section of the device;

Fig. 2 is a vertical section taken at right angles to the view shown in Fig. 1;

Fig. 3 is a section on line 3—3 of Fig. 1;

Fig. 4 is a section on line 4—4 of Fig. 2.

Referring now to the drawing, the reference character 10 designates a conduit or fitting which is interposed between the injector and the boiler for conducting water from the injector to the boiler as is usual in such constructions.

As usually constructed, this conduit is provided with a check valve which automatically closes to prevent the return flow of water from the boiler, and with a manually operated stop valve located between the check valve and the boiler, that may be manually closed when it is desired to replace or regrind the check valve or its seat, or to have access to the check valve seat or cage. This arrangement is objectionable because, when it is desired to operate the stop valve, it is necessary to manually operate the same, which necessitates the use of tools and the like.

This stop valve is operated only at intervals as occasion may require, hence the valve and seat may, between operations, become incrusted with rust or sediment or other foreign matter, and not properly function when it is attempted to operate the same. Furthermore, since this valve normally remains open, more or less sediment accumulates in the valve chamber above the check valve and may interfere with its proper seating or normal operation.

The present invention seeks to eliminate these difficulties by providing a stop valve that is automatic in its operation and is so constructed that it is self-cleaning. This valve automatically closes after each operation of the injector and consequently it prevents sediment from passing backward along the conduit and settling on or about the check valve.

The conduit 10 comprises the lower section 11 which may be in the form of a curved elbow threaded at its lower end as at 12 in the usual manner, and an upper section in the form of a casting 16. The upper end of the lower section 11 is provided with a cylindrical portion 13 which terminates in a valve seat 14 on which is seated the check valve 15.

The lower section 11 is connected to what for convenience of description will be termed the valve cage or upper section or casting 16 by a union joint whereby the parts may be readily disconnected. As shown, the cylindrical portion 13 of the lower section of the conduit slidably engages in the lower end of the valve cage or casting 16 and is provided with a flange 17 having a reduced portion 18 forming a shoulder 19. The lower end of the valve cage or casting 16 is threaded and rests on the flange 17.

A union nut having an inwardly extending flange 21 for engaging the shoulder 19 is threaded on the lower end of the casting 16 for connecting the parts together in the usual manner. The casting 16 is provided with an enlarged space which forms the check valve chamber 22 for the check valve 15. This valve seats on the upper end of the cylindrical portion 13 and is provided with depending guide members 23 that engage within the cylindrical portion for positioning the valve and for guiding it in its vertical movements.

A drain passage 24 adapted to be closed by a valve 25 is provided in the lower portion of the side wall of the valve chamber 22 whereby said valve chamber may be drained or "blown" or flushed out for cleaning the same as occasion may arise.

The cage or casting 16 is also provided with a second valve chamber 26 above the chamber 22 within which is mounted the ball stop valve 27. The partition 28 may be considered as dividing the valve cage 16 into an upper or stop valve chamber 26 and a lower or check valve chamber 22. The partition 28 between the chambers 22 and 26 is provided with an opening 29 the marginal edge of which forms a seat for the ball valve. The chamber 26 is provided with suitable valve guiding and positioning means as the vertical ribs 32 on the side walls of said chamber.

The casting 16 is provided with a laterally extending extension 33 having an axial opening 30 in communication with the valve chamber 26. This extension is provided with an attaching flange 44 for attaching the same to a boiler, as is usual in such constructions.

By means of this arrangement, water entering from the lower to the upper chamber from beneath the ball valve 27 and being discharged laterally through the passage 30, will cause the valve 27 to rotate, thereby preventing incrustation on said valve. The rotation of the valve will also tend to remove any foreign matter from the valve seat.

Suitable means are provided for positively securing the stop valve 27 on its seat. In the form of construction selected to illustrate one embodiment of the invention, the valve cage or casting 16 is provided with a threaded opening 31 in which is mounted a bonnet, hub or valve stem support 320. Adjustably mounted within this hub as by being threaded therein is the valve stem or spindle 330 of the valve engaging bell or member 34. The member 34 is provided with a concave surface 35 on its under surface for engaging said valve 27 whereby the same may be forced to its seat and positively held in such position by screwing the stem downwardly within the hub 320. An angular member 36 may be secured on the upper end of the stem or spindle 330 for receiving a wrench for turning and adjusting the stem through said hub.

We claim as our invention:

1. In a device of the class described, a valve cage, a partition within said cage dividing the same into an upper and a lower valve chamber, an intake passage for said lower valve chamber, a discharge passage extending laterally from said upper chamber, said partition being provided with an unobstructed port, an automatically operated ball stop valve normally seating by gravity, for said port, an automatically operated check valve for controlling the flow of a fluid into said cage from said intake passage, means for forcing said stop valve to its seat and retaining the same thereon, a drain passage for draining the space between said valves and a closure for said passage.

2. In combination, a valve cage having a partition therein dividing said cage into a lower and an upper chamber, said partition having an unobstructed port therein, a ball valve normally seated by gravity for closing said port, a passage extending laterally from said upper chamber whereby a liquid passing upwardly through said port and laterally through said passage will rotate said ball valve for preventing incrustation thereon, a passage leading into said lower compartment, and a check valve for said passage vertically beneath said ball valve and means laterally of said ball valve but below the horizontal plane thereof for preventing the contact of said check valve with said ball valve.

CHARLES M. HOUSE.
CARL J. CLUTTER.